(12) United States Patent
Sachs et al.

(10) Patent No.: US 9,204,309 B2
(45) Date of Patent: Dec. 1, 2015

(54) SPECTRUM SHARING USING POWER SPLIT BETWEEN PRIMARY AND SECONDARY TRANSMITTERS

(75) Inventors: Joachim Sachs, Stockholm (SE); Ivana Maric, Sunnyvale, CA (US); Andrea Goldsmith, Menlo Park, CA (US)

(73) Assignees: The Board of Trustees of the Leland Stanford Junior University, Palo Alto, CA (US); Telefonaktiebolaget L M Ericsson (publ), Stockholm (SE)

(*) Notice: Subject to any disclaimer, the term of this patent is extended or adjusted under 35 U.S.C. 154(b) by 536 days.

(21) Appl. No.: 13/639,151

(22) PCT Filed: Apr. 6, 2011

(86) PCT No.: PCT/US2011/000632
§ 371 (c)(1),
(2), (4) Date: Oct. 3, 2012

(87) PCT Pub. No.: WO2011/126570
PCT Pub. Date: Oct. 13, 2011

(65) Prior Publication Data
US 2013/0029706 A1  Jan. 31, 2013

Related U.S. Application Data

(60) Provisional application No. 61/341,952, filed on Apr. 6, 2010.

(51) Int. Cl.
*H04W 16/14* (2009.01)
(52) U.S. Cl.
CPC ................................. *H04W 16/14* (2013.01)

(58) Field of Classification Search
None
See application file for complete search history.

(56) References Cited

U.S. PATENT DOCUMENTS

| 5,960,352 | A | 9/1999 | Cherpantier |
| 2009/0042595 | A1 | 2/2009 | Yavuz et al. |
| 2010/0056184 | A1 | 3/2010 | Vakil et al. |
| 2010/0061351 | A1 | 3/2010 | Lee et al. |
| 2010/0081449 | A1* | 4/2010 | Chaudhri et al. .......... 455/452.2 |

OTHER PUBLICATIONS

Taki et al., "Spectral Efficiency Optimized Adaptive Transmission for Cognitive Radios in an Interference Channel,", Feb. 28, 2009, arXiv:0903.0099 [cs.IT].

* cited by examiner

*Primary Examiner* — Philip Sobutka
(74) *Attorney, Agent, or Firm* — Lumen Patent Firm (57) ABSTRACT

A wireless spectrum is shared between a primary communication system and secondary communication system operating in an overlapping geographical region. A primary transmitter broadcasts a primary signal, and a secondary transmitter transmits a secondary signal, both using a primary wireless spectrum assigned to the primary communication system. The secondary transmitter transmits the secondary signal to a secondary receiver with power $(1-\alpha)P$ and transmits the primary signal with power $\alpha P$. The parameter $\alpha$ is computed to ensure a predetermined quality of reception of the primary signal by a hypothetical primary receiver located near the secondary transmitter. The secondary transmitter may compute a feasibility of using cognitive transmission and, when the computed feasibility exceeds or does not exceed a feasibility threshold, it selects to enable or disable, respectively, the use of the primary wireless spectrum to transmit from the secondary transmitter.

19 Claims, 6 Drawing Sheets

900 Determine a demand for additional capacity of a first (cognitive) wireless communication system in a certain region based on, e.g., traffic demand, traffic demand type (QoS requirements), available resources.

902 Determine costs associated with enabling cognitive transmission in a certain spectrum within a certain region, e.g., secondary license costs, spectrum demand.

904 Determine feasibility thresholds for cognitive transmission in a certain spectrum according to demand for additional capacity and/ or costs associated with cognitive transmission in a certain spectrum within a certain area.

906 Determine feasibility of cognitive transmission in a certain spectrum within a certain region depending on (1) channel gains between possible cognitive transmitters and receivers, and primary transmitters and receivers, and (2) transmitter/receiver capabilities and/or velocity/mobility.

908 Compare feasibility of cognitive transmission in a certain spectrum to predetermined feasibility thresholds, and determine if and which transmitters/receivers are used for cognitive spectrum access according to this comparison.

910 Configure the transmitter/receiver procedures for cognitive transmission in a certain spectrum such that the largest feasibility of cognitive transmission is achieved.

*Fig. 9*

SPECTRUM SHARING USING POWER SPLIT BETWEEN PRIMARY AND SECONDARY TRANSMITTERS

CROSS-REFERENCE TO RELATED APPLICATIONS

This application is a 371 of PCT Patent Application PCT/US2011/000632 filed Apr. 6, 2011, which claims the benefit of U.S. Provisional Application 61/341,952 filed Apr. 6, 2010.

STATEMENT OF GOVERNMENT SPONSORED SUPPORT

This invention was made with Government support under contract W911NF-07-1-0029 awarded by Defense Advanced Research Projects Agency, and under contract W911NF-05-1-0246 awarded by U.S. Army Research Laboratory. The Government has certain rights in this invention.

FIELD OF THE INVENTION

The present invention relates generally to wireless communications systems. More specifically, it relates to cognitive radio techniques for sharing wireless spectrum.

BACKGROUND OF THE INVENTION

The electromagnetic spectrum is used by a variety of different wireless communication systems, such as terrestrial wireless communication systems, satellite communication systems, broadcasting services and radio navigational systems. To prevent signal interference between different transmissions, access to specific portions of the wireless spectrum is regulated by national and international policies. The most common form of spectrum regulation is that different parts of the radio spectrum are allocated to different types of services, with this allocation typically lasting for several decades.

Over the last twenty years there has been a tremendous proliferation of certain wireless communication systems such as cellular telephone systems and wireless data networks. This growth has led to a large demand for use of the limited spectrum resources that have been allocated to these systems. Moreover, the predicted spectrum capacity demand for the coming decades by far exceeds what can be provided by the limited spectrum bands allocated to current cellular and wireless data systems. At the same time, spectrum resources assigned to certain other systems are only sparsely used. Consequently, new paradigms of dynamic spectrum access have been investigated in recent years by regulatory and standardization bodies. For example, the US Federal Communications Commission ruled in 2008 to allow secondary communication systems to operate within the television (TV) broadcast spectrum. In this approach to dynamic spectrum access, secondary systems are permitted to access spectrum resources that have been allocated to a primary system, provided that the secondary system does not harmfully interfere with the primary service. However, the condition that the secondary system cannot cause noticeable degradation of the primary service creates various technical challenges, and various approaches have been developed to address these challenges.

Primary-secondary spectrum sharing can be implemented in three different ways: underlay, interweave and overlay operation. In underlay operation, the secondary system transmits at a signal level that is below an interference level that is close to the noise level, thereby ensuring that the secondary transmission remains mostly unnoticed by the primary system. This approach has little benefit for most systems such as cellular communication systems and is typically used in local short-range ultra-wideband systems. In interweave operation, the secondary system intelligently determines spectrum holes or spectrum white spaces that remain unused by the primary system in time, frequency and/or geographic location. This strategy is based on cognitive radios that can detect the usage of spectrum resources in order to discover spectrum usage opportunities. In the interweave approach, cognitive radios use their capabilities solely for dynamic access to unused frequency bands. To operate a network close to its capacity limits, this approach is too restrictive.

The overlay approach relaxes the assumption of orthogonal transmissions, and attempts to exploit cognition more generally for cooperation, precoding against interference and interference cancellation. In overlay operation, the secondary system is assumed to know, in the most ideal case, in advance the message that is transmitted by the primary transmitter, as well as the codebook of the primary system. This allows the secondary system to design its own transmitted signal such that interference from the primary system to the secondary receiver can be mitigated. At the same time, the secondary system can cooperate with the primary system by relaying the primary signal; this enables the secondary system to compensate for interference that it causes to the primary receivers.

Theoretical results indicate that the cognitive radio techniques used in the overlay approach should provide a valuable capacity extension for a secondary system. In practice, the achievable benefits strongly depend on the channel characteristics. For example, in certain practical scenarios the benefits of implementing cognitive transmission for overlay operation may be negligible, whereas in other scenarios a large gain may be achieved. Blindly applying cognitive transmission for a secondary system is not necessarily beneficial. Currently, knowledge is lacking on when cognitive transmission may be useful. Moreover, for cognitive transmission it has been typically assumed in prior work that perfect channel information of all the channel gains is available at the transmitter. In systems where such channel information is not available, prior techniques for cognitive transmission are not applicable, or provide significantly reduced performance. The use of cognitive transmission is further complicated in the case of a primary broadcast system since there are multiple receivers of the primary broadcast signal, and in this scenario it is not possible to apply the cognitive transmission methods proposed in prior work.

In view of the above, there is clearly a need for solutions to the outstanding challenges in realizing cognitive transmission overlay operation, especially in the case where the primary communication system is a broadcast system.

SUMMARY OF THE INVENTION

In one aspect, the present invention provides techniques to apply the overlay approach to enable spectrum sharing between a primary broadcast system, such as a TV system, and a secondary communication system, such as a cellular mobile broadband system. Furthermore, in another aspect, the invention provides a technique to quantify the feasibility of overlay-based spectrum sharing using cognitive transmission and to configure the secondary system to efficiently make use of primary spectrum resources. In other aspects, the invention provides ways to estimate unknown channel gains and provides a solution for relaying primary signals to unknown receivers of a primary broadcast network.

In one aspect, the present invention provides a method for wireless spectrum sharing between a primary communication system and secondary communication system such as, for example, a television broadcast system and a cellular communication system. The primary communication system includes a primary transmitter such as, for example, a television broadcast transmitter and may also include any number of primary receivers such as, for example, television receivers. The secondary communication system includes a secondary transmitter and secondary receiver. The secondary transmitter may be, for example, a cellular base station during downlink operation or a cellular user device during uplink operation. Similarly, the secondary receiver may be a cellular base station during uplink operation or a cellular user device during downlink operation. The secondary communication system may also include additional secondary transmitters and additional secondary receivers. For example, multiple cellular base stations may serve corresponding cells in a cellular communication system and multiple cellular user devices may operate in any of the cells.

According to the method of spectrum sharing, the primary transmitter broadcasts a primary signal using a primary wireless spectrum that is assigned to the primary communication system. Operating in an overlapping geographical region, the secondary transmitter transmits a secondary signal to a secondary receiver using the primary wireless spectrum assigned to the primary communication system. The secondary communication system may have no wireless spectrum assigned to it, or it may be assigned a secondary wireless spectrum distinct from the primary wireless spectrum. In any case, the secondary transmitter uses the primary spectrum assigned to the primary communication system. The secondary transmitter transmits with a total power P split between power $\alpha P$ used to transmit the primary signal and power $(1-\alpha)P$ used to transmit the secondary signal to the secondary receiver. The parameter $\alpha \in [0,1]$ is computed by the secondary transmitter such that the transmission of the secondary signal ensures a predetermined quality of reception of the primary signal by a hypothetical primary receiver located near the secondary transmitter. To enable the secondary transmitter to transmit the primary signal, the method preferably includes communicating from the primary communication system to the secondary transmitter codewords (data) and transmission timing information of the primary signal. The primary signal and secondary signal are preferably transmitted from the secondary transmitter using superposition coding or dirty paper encoding. The secondary receiver may receive the primary and secondary signals and then use interference cancellation to cancel the primary signal, or just decode secondary signals.

The method may include estimating by the secondary receiver channel state information of the channel from the primary transmitter to the secondary receiver. The secondary receiver may then use the estimated channel state information to perform interference cancellation. The secondary receiver may also transmit the estimated channel state information to the secondary transmitter. The secondary transmitter may then use the estimated channel state information to perform dirty paper encoding. The method may also include estimating by the secondary transmitter channel state information of the channel from the primary transmitter to the hypothetical primary receiver located near the secondary transmitter.

Preferably, the method also includes computing by the secondary transmitter a feasibility of using cognitive transmission and, when the computed feasibility exceeds or does not exceed a feasibility threshold, selecting to enable or disable, respectively, the use of the primary wireless spectrum to transmit from the secondary transmitter. The feasibility may be computed, for example, from channel state information, velocity of the secondary transmitter, velocity of the secondary receiver, and/or capabilities of the secondary receiver. The feasibility threshold may be fixed or dynamic, determined separately for each transmitter or receiver, and can also be determined separately for uplink and downlink operation. The feasibility threshold may be determined, for example, from a cost for the secondary communication system to use the primary wireless spectrum.

These and other aspects of the invention will be evident from the following description and accompanying figures.

DETAILED DESCRIPTION

Embodiments of the present invention use cognitive transmission techniques in which a secondary communication system learns what message is being or will be sent from a primary system. In some variations, only parts of the primary message may become known by the secondary system, in which case the performance of cognitive transmission may be reduced. Using its knowledge of the primary message, the secondary system can then adapt its own transmission to mitigate its interference with the primary system, assuming that the channel gains can be estimated.

Figure 1:
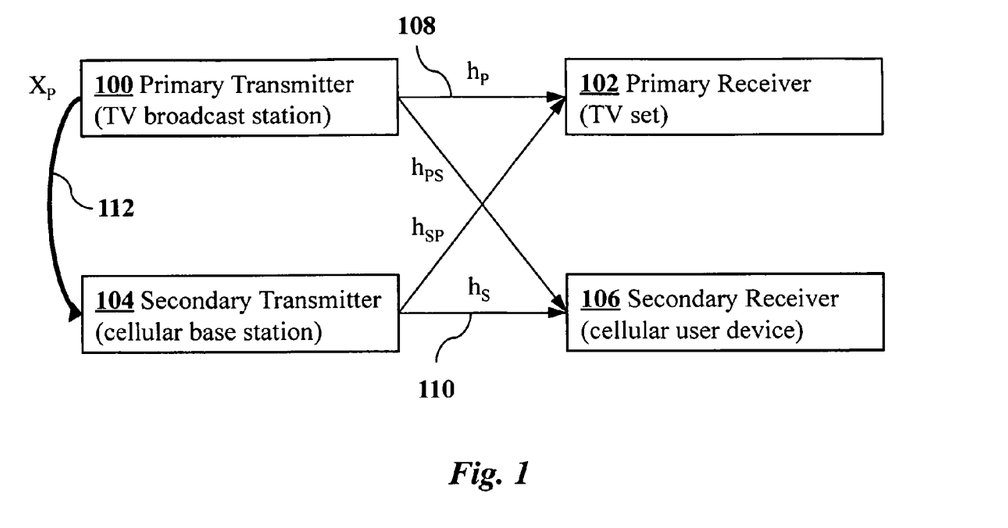
FIG. 1 is a schematic block diagram of transmitters and receivers in primary and secondary communication systems, including channel paths between them, according to an embodiment of the present invention.

FIG. 1 is a schematic block diagram of a primary-secondary communication system according to one embodiment of the invention. A primary transmitter 100 transmits with power $P_P$ to a primary receiver 102. A secondary transmitter 104 transmits with power $P_S$ to a secondary receiver 106. Secondary transmitter 104 transmits using knowledge of the codeword ($X_P''$) that is transmitted by the primary transmitter 100. This knowledge is communicated from the primary transmitter 100 to the secondary transmitter 104 via communication channel 112. The primary communication is transmitted over a primary channel 108 having channel gain $h_P$ and noise $Z_P$. The secondary communication is transmitted over a secondary channel 100 having channel gain $h_S$ and noise $Z_S$. The primary transmission interferes with the secondary transmission with channel gain $h_{PS}$, and the secondary transmission interferes with the primary transmission with channel gain $h_{SP}$. In one particular realization of this communication system, primary transmitter 100 is a TV broadcast transmitter, primary receiver 102 is a TV receiver, secondary transmitter 104 is a cellular base station, and secondary receiver 106 is a cellular user device such as a cell phone, smart phone, or wireless network transceiver. In this case, the base station 104 is transmitting a downlink transmission to the cellular user device 106.

Using cognitive transmission techniques, the secondary transmission can be achieved without degrading reception of the primary signal by the primary receiver. Specifically, the secondary transmitter 104 uses part of its transmission power i.e., power $\alpha P_S$, to relay the primary signal to the primary receiver 102 (i.e., it sends the same signal as the primary system) and thereby amplifies the primary received signal. As a result, the primary receiver 102 can obtain the same signal-to-noise-and-interference ratio (SINR) as if no secondary transmission took place. With the remainder of its transmit power, i.e., power $(1-\alpha)*P_S$, the secondary system transmits its own data. For example, the secondary system can use a coding technique at the transmitter (e.g., Gel'fand Pinsker coding, Dirty Paper coding or Lattice coding) against the primary-to-secondary interference, and in the decoding of the message at the secondary receiver the interference from the primary transmitter is thereby largely (or completely) removed. Alternatively, the secondary receiver can decode the primary signal and perform interference cancellation before decoding the secondary signal.

Figure 2:
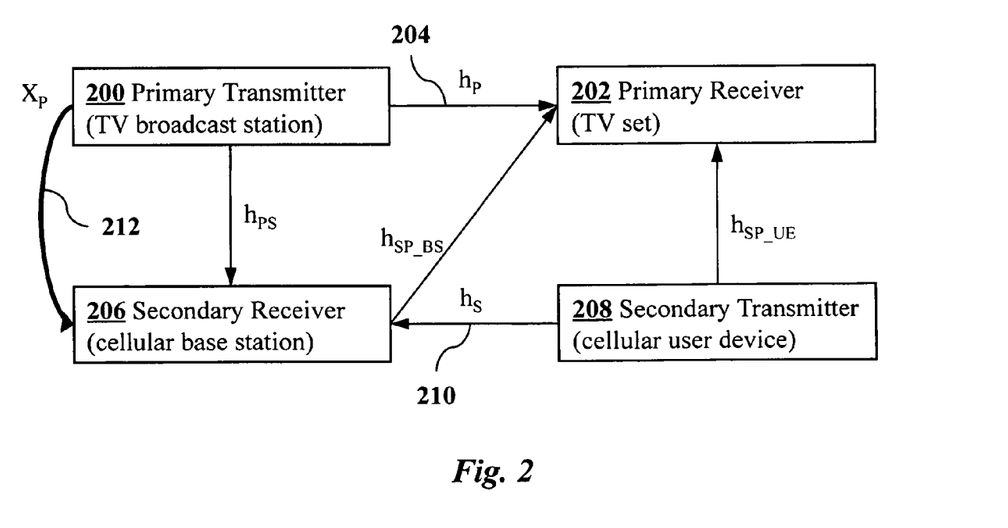
FIG. 2 is a schematic block diagram of transmitters and receivers in primary and secondary communication systems, including channel paths between them, according to another embodiment of the present invention.

FIG. 2 illustrates a primary-secondary system in uplink operation. In this case it is the secondary receiver that learns the codeword that is being sent by the primary transmitter. It then relays the primary signal to compensate for interference caused by the transmission of the secondary signal. Interference from the primary transmission can be cancelled at the secondary receiver. More specifically, primary transmitter 200 transmits to primary receiver 202 over channel 204, similar to the operation in FIG. 1. Secondary transmitter 208 (e.g., cellular user device in uplink operation) transmits to secondary receiver 206 (e.g., cellular base station in uplink operation) over channel 210. In this case, however, secondary receiver 206 rather than secondary transmitter 208 receives the primary codewords over channel 212 and transmits a signal to primary receiver 202 to mitigate interference from secondary transmitter 208.

The primary and secondary wireless communication systems may be any of various kinds of wireless communication systems. In a preferred embodiment, the primary communication system is a TV broadcast system and the secondary communication system is a mobile communication system. Examples of mobile networks are 3GPP GSM EDGE Radio Access Networks (GERAN), 3GPP Universal Terrestrial Radio Access Networks (UTRAN), 3GPP Evolved-UTRAN (E-UTRAN), CDMA2000 networks and their evolution, WiMAX networks, WLAN networks, networks according to the standards of IEEE 802.20 and IEEE 802.22. Examples of digital TV broadcast systems are digital terrestrial video broadcast (DVB-T, mainly used in Europe, Australia and parts of Asia, Africa and South America), Advanced Television Systems Committee standard (ATSC, mainly used in USA, Canada, Mexico), Integrated Services Digital Broadcasting (ISDB, mainly used in Japan and parts of South America), Digital Terrestrial Multimedia Broadcast (DTMB, mainly used in China).

There are multiple reasons why this type of primary-secondary system combination is of particular practical relevance. Firstly, a TV broadcast system is a static system that is easily understood and most information (e.g., transmitter positions, antenna elevation, direction and gain, transmit power) is often provided in public accessible databases. Secondly, a TV broadcast system operates typically at high power and with highly elevated transmit antennas, which lead to wide area coverage (often on the order of hundreds of km). This makes the interference situation with another system operating at much smaller scale (such as a mobile communication system with cell sizes in the range of hundreds of meters to several km) comparatively easy to examine, even if some uncertainty concerning the exact propagation behavior exists. Thirdly, a TV broadcast system has a distribution network between the TV stream encoder and the transmitters. This allows a secondary system to obtain the codewords transmitted at the primary transmitters by connecting the secondary system to the TV distribution network. Alternatively, a secondary system can obtain the primary signal directly via radio transmission. Fourthly, most digital terrestrial frequency networks support so-called single frequency network (SFN) operation. With SFN operation multiple TV transmitters with overlapping coverage areas transmit an identical TV signal on the same frequency channel in a time-synchronized fashion. Time synchronization is achieved, for example, via some positioning system (like the global positioning system) or some network synchronization procedure used in the distribution network. This SFN operation allows a TV receiver to receive multiple signals containing the same information, which can be combined into a single stronger received signal. SFN operation is mainly considered in broadcast networks for spectrally efficient operation with macro diversity, but also for specific coverage control by means of gap fillers (for example, co-channel repeaters, booster or broadcast translators). With secondary cognitive transmission, a secondary transmitter can take over the role of a SFN transmitter to amplify the primary signal without any need of modification of the deployed TV receivers. Fifthly, a TV broadcast system has a significant amount of spectrum resources allocated (in the order of 300-400 MHz), which can provide sufficient additional capacity for secondary operation. In addition, the TV spectrum has very favorable propagation characteristics for wireless communication systems and enables cost-efficient network design. Sixthly, for TV broadcast systems it is more politically feasible to obtain regulatory authorization for secondary usage compared to other more sensitive systems such as radio navigation, radar or military spectrum services.

Mobile broadband networks are well suited as secondary spectrum users in TV spectrum. One advantage is that network infrastructure with wide coverage is already available and can be reused for cognitive transmission in TV spectrum. Therefore, only limited infrastructure investment is needed for spectrum with low guarantees for return on investment. Furthermore, a mobile broadband network has a backhaul network that can be used to connect to a TV distribution network to obtain primary codewords for cognitive transmission. Finally, mobile broadband networks face a tremendous spectrum demand to meet their current and future capacity requirements.

There are some differences between the cellular and the TV system that are important for our solution. A TV transmitter typically transmits at high power with up to several hundred kilowatts; this results in radio cell radii—or service areas—reaching beyond 100 km. In contrast, cellular networks have typical transmit powers around 20 W with cell radii of a few kilometers. This difference in scale between the TV and cellular systems allows us to derive different regions of secondary spectrum usage in the TV service area. Furthermore, TV systems are unidirectional, broadcast systems with one TV transmitter and multiple TV receivers for the same data stream. These properties result in modifications to the original cognitive transmission schemes of a secondary system. A cellular radio cell has multiple users with mostly individual unicast data streams. Different data streams are separately transmitted by orthogonal signaling, e.g., by time, frequency and/or code division multiple access. Due to this orthogonality the cognitive transmission scheme for spectrum sharing can be applied to each of the cellular data streams independently. Traffic streams can be directed in either the downlink (from the base station to the user) or uplink (from the user to the base station) direction. The cellular network might use the TV spectrum in different ways. In one option the cellular network would use the TV channel as an uplink-only or a downlink-only carrier. The TV channel could then complement other cellular carriers in use to increase the capacity in one direction. The system would preferably operate in frequency division duplex mode. This option would be some special form of carrier aggregation that is considered for advanced cellular broadband networks. Another option is to use the TV channel for secondary transmission in time division duplex mode. In this case, the cellular network would alternate between uplink and downlink transmission in the TV band. We will evaluate the transmission scheme and the performance independently for downlink and uplink secondary transmission.

Figure 3:
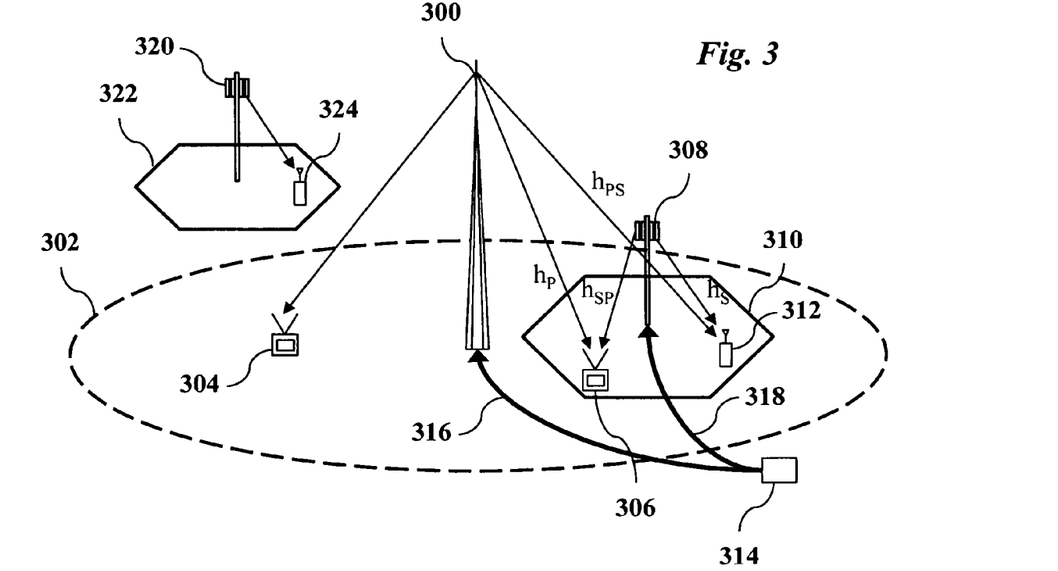
FIG. 3 is a schematic diagram of components of a TV broadcast system and a cellular communication system operating in downlink mode, according to an embodiment of the present invention.

FIG. 3 is a schematic illustrating a primary TV broadcast system sharing a primary spectrum with a secondary mobile network operating in downlink mode. A TV broadcast transmitter 300 broadcasts in a geographical region 302 to receivers 304 and 306. A cellular base station 308 transmits in a cell 310 to user device 312 using the wireless spectrum assigned to the TV broadcast system. Digital TV encoder 314 distributes codewords and timing information to TV broadcast transmitter 300 via distribution network link 316. In addition, the codewords and timing information are also distributed to base station transmitter 308 via distribution network link 318. Base station 308 may then use the codewords to perform cognitive transmission. Although the cells may in general be outside of the TV service area, in this particular example, cell 310 geographically overlaps with service area 302 of TV broadcast transmitter 300. Consequently, without cognitive radio techniques, mobile device 312 would experience interference from TV transmitter 300, and TV receiver 306 would experience interference from base station transmitter 308. Note, however, that base station 320 transmitting using the primary spectrum to user device 324 in cell 322 that is far outside of the service area of TV transmitter 300 does not interfere with any primary TV signal at user device 324, so no cognitive transmission is required to avoid interference.

Figure 4:
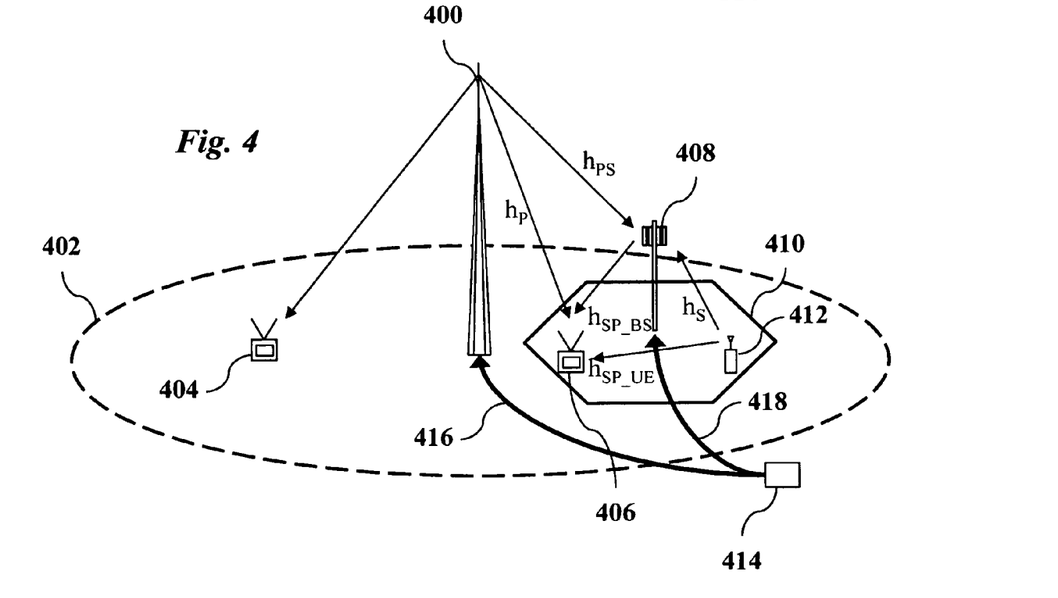
FIG. 4 is a schematic diagram of components of a TV broadcast system and a cellular communication system operating in uplink mode, according to an embodiment of the present invention.

FIG. 4 is a schematic illustration a primary TV broadcast system sharing a primary spectrum with a secondary mobile network operating in uplink mode. A TV broadcast transmitter 400 broadcasts in a geographical region 402 to receivers 404 and 406. A cellular base station 408 operating in a cell 410 receives uplink signals from user device 412 using the wireless spectrum assigned to the TV broadcast system. Digital TV encoder 414 distributes codewords and timing information to TV broadcast transmitter 400 via distribution network link 416. In addition, the codewords and timing information are also distributed to base station 408 via distribution network link 418. Base station 408 may then use the codewords to perform cognitive transmission to TV 406.

Figure 5:
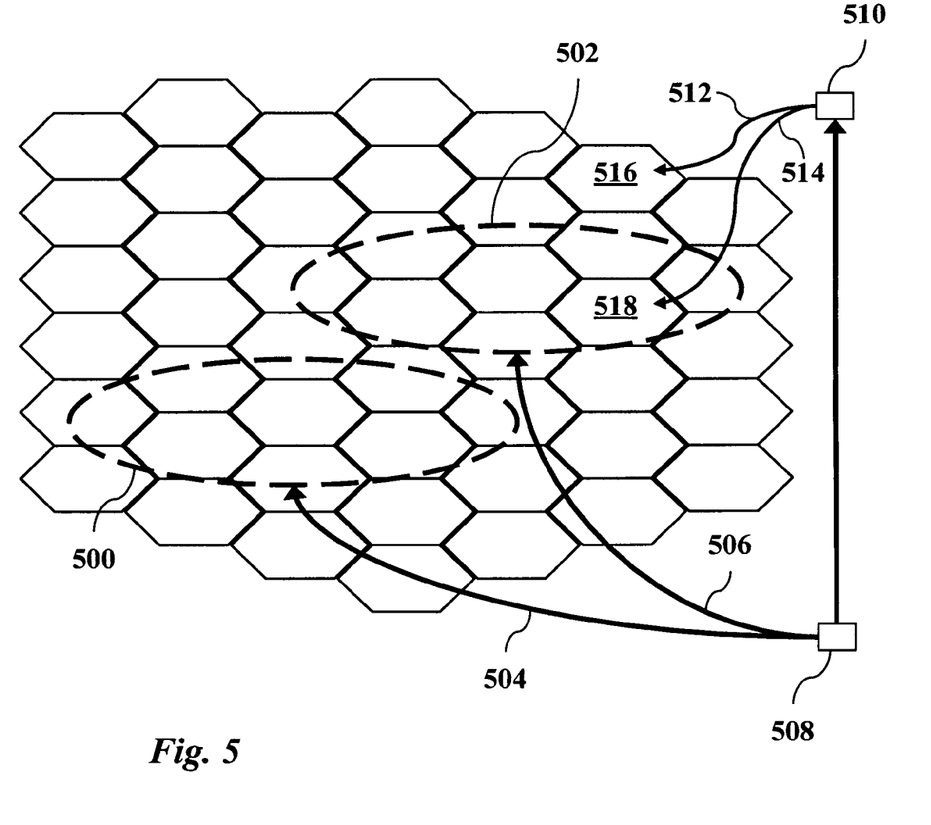
FIG. 5 is a schematic diagram of components of a TV broadcast system and a cellular communication system, including TV signal distribution links to support relaying TV signals by the cellular system, according to an embodiment of the present invention.

Embodiments of the present invention introduce in the cellular network system a new TV band transmission management function, which can receive the DTV encoded primary codewords with their respective transmission timing. The TV band transmission management function determines the feasibility of activating spectrum sharing and manages the spectrum sharing for the system. For example, it can determine which cellular cells shall be used for secondary transmission; this decision can be based, e.g., on the load in the radio cells and the demand for additional capacity. The primary codewords and transmission timing are provided to those base stations via the cellular core network in the same way as they are provided to the TV transmitters via the DTV distribution network. FIG. 5 illustrates TV and cellular systems in overlapping geographical regions. Encoder 508 sends TV signals to TV service areas 500 and 502 via communication links 504 and 506, respectively. The TV signals are also sent to cellular management device 510 which, in turn, distributes the signals via links 512 and 514 to selected cells 516 and 518, respectively, for relaying using cognitive transmission. Typically, the cellular network normally operates in a dedicated band of wireless spectrum, distinct from the band allocated to the TV broadcast system. The mobile network can increase its capacity by becoming a to secondary user of the TV spectrum through cognitive transmission.

Cognitive relaying of the primary system leads to a reduced capacity of the secondary system since only parts of the transmit power remains. This results in a loss of the link budget for secondary transmission. However, when comparing secondary cellular transmission in TV spectrum with a standalone cellular network transmitting around 2 GHz carrier frequency, the loss due to relaying is partly compensated by a path loss that is more than 10 dB lower at 500 MHz compared to 2 GHz.

While cognitive transmission promises a valuable capacity extension for a secondary system, the achievable benefits strongly depend on the channel characteristics, e.g., estimated or measured channel gains between transmitters and receivers. In certain scenarios, however, this gain can be negligible or cognitive transmission may even fail, whereas in other scenarios a large gain may be achieved. Accordingly, the embodiments of the present invention provide techniques to determine whether cognitive transmission for a secondary system is feasible. Also provided are techniques to determine and/or estimate channel characteristics and implement cognitive transmission.

The performance of cognitive transmission depends on the system parameters and the used transmission technology. For example, the transmit powers and the channel gains (and knowledge thereof) strongly influence the transmission performance. Prior techniques are limited because they strongly depend on perfect channel state information at the cognitive transmitter. The present techniques, in contrast, do not have this limitation and allow partial channel knowledge and provide methods for it to be obtained. Further, the transmission methods (e.g., the coding and modulation schemes and the receiver algorithms) determine what performance can be achieved. Performance is defined here as a received signal-to-interference-and-noise ratio (SINR).

The primary-secondary overlay scheme described above will now be described in more detail. The primary transmitted and received signals, respectively, are denoted $X_P$, $Y_P$. Similarly, the secondary transmitted and received signals, respectively, are denoted $X_S$, $Y_S$. Receiver noise $Z_p$, $Z_s$ is zero-mean, complex Gaussian with independent real and imaginary parts and respective variance $N_p$, $N_s$. The noise power at the primary and secondary receivers, respectively, is hence $N_P$, $N_S$. The received signals are then related to the transmitted signals as follows:

$$Y_p = h_p X_p + h_{sp} X_s + Z_p$$

$$Y_s = h_{ps} X_p + h_s X_s + Z_s. \quad (1)$$

In the system model considered in prior works, it is assumed that encoders have perfect knowledge of all channel gains in the system. In the scenarios considered in the embodiments of this invention, such knowledge is typically not available. Accordingly, we assume that transmitters do not have the knowledge of the exact channel phase (delay) to all primary TV receivers in the channel. We further assume that the path losses $|h_S|$, $|h_{SP}|$ and $|h_{SP}|$ can be obtained at the secondary encoder.

In a TV system, all users receive the same service, which is a TV data stream transmitted at a constant data rate. A receiver can successfully decode the TV signal if the signal-to-interference-and-noise-ratio (SINR) at the receiver is larger than a minimum SINR threshold, $\gamma_{TVmin}$. The SINR value decreases with the distance between the receiver and the transmitter due to propagation path loss. Primary-secondary spectrum sharing requires the secondary system to protect the primary service. For a TV system this means that the SINR of the TV signal needs to remain larger than the SINR threshold within the TV service area.

Downlink Transmission

In downlink mode (FIGS. 1 and 3), the cellular base station (BS) is the secondary transmitter ($T_S$) and the cellular user equipment (UE) is the secondary receiver ($R_S$). The BS splits its power, $P_{s\_BS}$, into two parts: With power $\alpha P_{s\_BS}$ it relays the primary signal, and with power $(1-\alpha) P_{s\_BS}$ it transmits secondary information to its desired user. Power $\alpha P_{s\_BS}$ is chosen such that the quality of service (rate) at the primary receivers is unaffected by the presence of the cellular system. How this can be guaranteed for all TV users, and with imperfect channel knowledge at the secondary transmitter, will be explained in more detail below.

The two parts of the secondary signal may be encoded using superposition coding, yielding the channel input as follows:

$$X_s = \sqrt{(1-\alpha)} \cdot \hat{X}_s + \sqrt{\frac{\alpha \cdot P_{s\_BS}}{P_p}} \cdot X_p, \quad (2)$$

where $\hat{X}_S$ is the secondary information.

Codebooks are chosen to be Gaussian, i.e., $X_P \sim N[0, P_p]$, $X_S \sim N[0, P_{s\_BS}]$ and $\hat{X}_S \sim N[0, P_{s\_BS}]$. We consider two possible encoding/decoding schemes for the secondary communication:

1. $\hat{X}_s$ is generated via dirty paper coding (DPC), while treating the signal carrying $X_p$ as interference at the secondary receiver. This will remove the effect of interference at the secondary user, allowing it to achieve the rate as if this interference was not present.

2. No dirty paper coding is done at the cognitive encoder. Instead, the secondary receiver performs interference cancellation of the primary signal. Again, this will allow the cognitive receiver to achieve the interference-free rate.

We note that in the present embodiments the secondary system uses the same codebook for primary information, as given by Eq. 2.

Uplink Transmission

The uplink transmission model (FIGS. 2 and 4) differs from the downlink in that the cognitive base station is now the receiver ($R_{S\_BS}$) and the user equipment is the secondary transmitter ($T_{S\_UE}$). The UE is not aware of the primary transmission and the secondary channel input $X_s$ encodes only the secondary message with a Gaussian codebook, i.e., $X_s \sim N[0, P_{s\_UE}]$, with the UE transmitter power $P_{s\_UE}$. The UE causes interference to the primary TV receiver. The secondary system can compensate for this interference by relaying the primary signal from the cognitive base station. In contrast to the downlink case, the secondary transmitter that relays the primary signal ($T_{S\_BS}$) is different from the secondary transmitter of the secondary communication ($T_{S\_UE}$); we reflect this in our notation by adding BS and UE according to the indices of channel gains. Due to cognition, the BS can perform interference cancellation of the primary TV signal. We further assume that the base station receiver ($R_{S\_BS}$) can be shielded from the base station transmitter ($T_{S\_BS}$) so that the secondary received signal is not interfered with by the relayed primary signal. This enables the secondary communication link to achieve the interference-free rate.

Protecting Primary Quality of Service in Downlink

For the encoding scheme given by Eq. 2, the received signals of Eq. 1 become $$Y_p = \left(h_p + h_{sp\_BS} \sqrt{\frac{\alpha \cdot P_{s\_BS}}{P_p}}\right) X_p + h_{sp\_BS} \sqrt{(1-\alpha)} \hat{X}_s + Z_p \quad (3)$$

$$Y_s = \left(h_{ps} + h_s \sqrt{\frac{\alpha \cdot P_{s\_BS}}{P_p}}\right) X_p + h_s \sqrt{(1-\alpha)} \hat{X}_s + Z_s.$$

From Eq. 3 it follows that the received SINR at the primary receiver is $$SINR_p = \frac{\left|h_p \sqrt{P_p} + h_{sp\_BS} \sqrt{\alpha \cdot P_{s\_BS}}\right|^2}{N_p + (1-\alpha)|h_{sp\_BS}|^2 P_{s\_BS}}. \quad (4)$$

This SINR could be maximized by coherently aligning (i.e., beamforming) the received signals from the primary and secondary transmitters. We note that even if the phase was precisely known to the secondary transmitter (which we do not assume), the beamforming could only be done with respect to one single TV receiver. Instead, we assume that the phase difference between the two paths is random and uniform. The average SINR then becomes $$\overline{SINR}_p = \frac{|h_p|^2 P_p + \alpha |h_{sp\_BS}|^2 P_{s\_BS}}{N_p + (1-\alpha)|h_{sp\_BS}|^2 P_{s\_BS}} \quad (5)$$

Other transmission methods or different characteristics of the channel gains (e.g., Rayleigh fading, or frequency-selective fading) lead to slightly different SINR formulas. In these cases the same approach can be applied leading only to minor variations of the solution outlined here, as will be understood by those skilled in the art.

In order to protect the primary system from service degradation, the SINR at the receiver must be kept larger than the SINR threshold $\gamma_{TVmin}$. From (5) the power with which the secondary BS has to relay the primary TV signal in order to meet the TV protection requirement can be determined as $$\alpha = \frac{\gamma_{TVmin} \cdot (N_p + P_{s\_BS} \cdot |h_{sp\_BS}|^2) - P_p \cdot |h_p|^2}{(1 + \gamma_{TVmin}) \cdot P_{s\_BS} \cdot |h_{sp\_BS}|^2}, 0 \le \alpha \le 1. \quad (6)$$

Protecting Primary Quality of Service in Uplink

Similarly to the downlink, the received signals in the uplink direction are $$Y_p = \left(h_p + h_{sp\_BS}\sqrt{\frac{\alpha \cdot P_{s\_BS}}{P_p}}\right)X_p + h_{sp\_UE}X_s + Z_p$$

$$Y_s = h_{ps}X_p + h_sX_s + Z_s.$$

The received SINR at the primary receiver is then $$SINR_p = \frac{\left|h_p\sqrt{P_p} + h_{sp\_BS}\sqrt{\alpha \cdot P_{s\_BS}}\right|^2}{N_p + |h_{sp\_UE}|^2 P_{s\_UE}}.$$

The average SINR is $$\overline{SINR_p} = \frac{|h_p|^2 P_p + \alpha |h_{sp\_BS}|^2 P_{s\_BS}}{N_p + |h_{sp\_BS}|^2 P_{s\_UE}}.$$

The power fraction required for cooperation becomes $$\alpha = \frac{\gamma_{TVmin} \cdot (N_p + P_{s\_UE} \cdot |h_{sp\_UE}|^2) - P_p \cdot |h_p|^2}{P_{s\_BS} \cdot |h_{sp\_BS}|^2}, 0 \le \alpha \le 1. \quad (7)$$

Secondary Communication Performance

In the downlink, DPC or interference cancellation eliminates the effect of interference at the cognitive receiver. The obtained SINR at the cognitive receiver is then $$SINR_s = \frac{(1-\alpha)|h_s|^2 P_{s\_BS}}{N_s}.$$

In the case in which no DPC or interference cancellation can be performed, the secondary user will decode desired information while treating interference as noise, yielding:

$$SINR_s = \frac{(1-\alpha)|h_s|^2 P_{s\_BS}}{N_s + |h_{ps}|^2 P_p + |h_s|^2 \alpha \cdot P_{s\_BS}}.$$

In the uplink, the obtained SINR at the cognitive receiver is $$SINR_s = \frac{|h_s|^2 P_{s\_UE}}{N_s}.$$

For the uplink, we assume that the cellular base station will always be able to cancel the primary TV signal, since it already knows the TV signal by cognition.

Obtaining Channel State Information in Downlink Mode

In a cellular system operating in downlink mode (FIGS. 1 and 3), the channel gains are typically measured by the mobile receiver and then fed back to the base station. Hence, the secondary encoder can obtain the path loss value $|h_s|$. We also assume that the mobile receiver estimates the channel from the TV transmitter, and sends $|h_{ps}|$ to back to the base station. This channel estimation can be performed if the pilot signal from the primary transmission can be decoded, i.e., if $$INR_s = \frac{K_p|h_{ps}|^2 P_p + K_s|h_s|^2 \alpha P_s}{N_s + (1-\alpha)|h_s|^2 P_s} \ge \gamma_{TVpilot} \quad (8)$$

where $INR_S$ is the interference-to-noise ratio at the secondary receiver and $\gamma_{TVpilot}$ is the required SINR for decoding the pilot signal. $K_p$ and $K_s$ are amplifications of pilot power at the primary and the secondary transmitters respectively; boosting of pilot power is supported in some digital TV standards like DVB-T.

On the other hand, a TV receiver does not provide any feedback. The TV system has to guarantee that the threshold $\gamma_{TVmin}$ (probabilistically) met at every TV receiver within the TV service area. Consequently, the secondary system, in order to co-exist in the same spectrum, needs to choose the relaying power $\alpha P_s$ so that the required threshold is maintained at every TV receiver.

For a primary system that is a TV system a particular problem exists, which is that it is a broadcast system with the implication that there are multiple receivers. As a result, the relay power of the secondary transmission system needs to be set to ensure that all TV receivers affected by the secondary transmission maintain their desired SINR. However, the TV receivers are typically not known, and neither are their channel gains. Our solution to the problem is to define a critical primary TV receiver, which is a hypothetical TV receiver which is most severely affected by the secondary transmission. If the cognitive transmission is configured according to the critical TV receiver, then all real TV receivers are very likely to receive at least the same performance as the imaginary critical TV receiver. A realistic choice of a critical primary (TV) receiver is to assume that it is located at minimum distance to the secondary transmitter (i.e. it is strongly affected by a signal transmitted from the secondary transmitter). For a downlink mobile broadband transmission, the channel gain $h_{SP}$ thus becomes a constant which represents the channel gain from the secondary transmitter to the critical primary receiver; this constant can, for example, be determined according to some propagation model or measurement.

Figure 6:
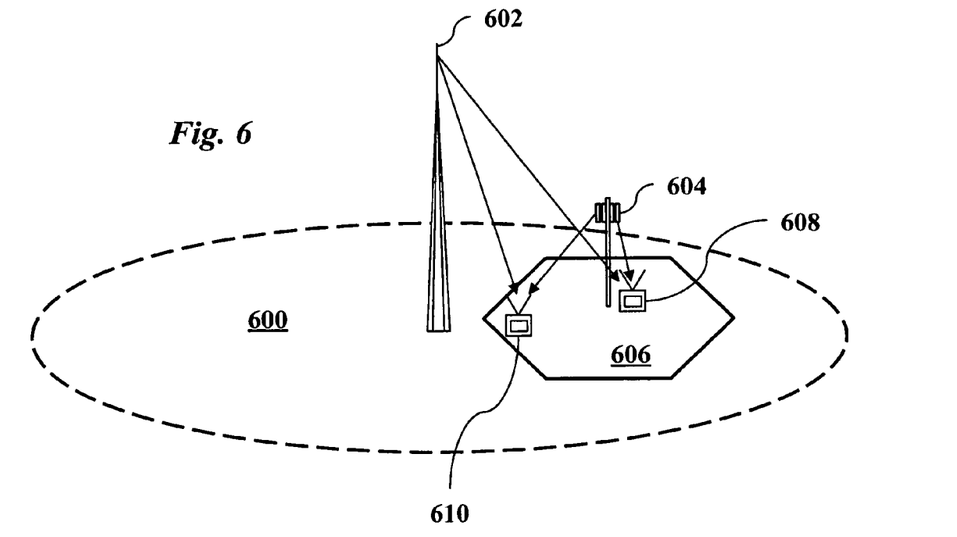
FIG. 6 is a schematic diagram of components of a TV broadcast system and a cellular communication system operating in downlink mode illustrating a critical TV receiver, according to an embodiment of the present invention.

The locations of TV transmitters and their transmit powers are typically publicly available information and is assumed to be known to the secondary system. However, primary channel gains to TV receivers are not known to the cognitive encoder. Our solution to the problem is to define a critical primary TV receiver, as a hypothetical TV receiver which is the most severely affected by the secondary transmission. FIG. 6 illustrates the critical primary receiver in the situation of secondary downlink mode. TV transmitter 602 broadcasts in TV service area 600 while cell base station 604 transmits in cell 606 within TV service area 600. Now consider TV receivers 608 and 610 located within cell 606. TV receiver 608 is positioned next to base station 604 at the center of the cell and thus experiences stronger interference from transmissions of base station 604 than TV receiver 610 which is positioned far away from the base station at the edge of the cell. Receiver 608 is thus the critical primary receiver in this situation. To ensure quality of service for the TV receivers, base station 604 thus needs to relay the primary signal with sufficient power to provide the critical receiver 608 with at least a minimum level of primary signal.

If, in a given situation, the relay power is chosen according to the critical TV receiver, then all TV receivers in the cell are expected to receive at least the same performance as the critical TV receiver. The critical TV receiver is the one for which the SINR in Eq. 5 is the lowest when the relay power a is zero. Since the size of the cell is much smaller than the service area of the TV system, $|h_p|$ is approximately the same for different TV receivers. The difference in SINR for different TV receivers is thus dominated by the interference caused by the secondary transmission. In downlink, a realistic choice of a critical primary (TV) receiver is to assume that it is located at a minimum distance from the secondary transmitter. The channel gain $|h_{sp}|$ thus becomes a constant that can be determined according to a propagation model or measurement. The base station can also estimate the primary channel gain $|h_p|$ to the critical TV receiver (which is assumed co-located with the BS) by decoding the pilot signal of the TV system. Alternatively, it could be derived from radio environment maps that have been proposed for cognitive radio systems in the TV band. With the estimated $|h_p|$ and $|h_{sp}|$ for the critical receiver, the relay power can be determined according to Eq. 6; with the measured $|h_s|$ and $|h_{ps}|$ secondary transmission can be performed with either dirty paper coding or interference cancellation.

The channel gain from the TV transmitter to the critical TV receiver $h_p$ can be estimated in several ways. Since the critical TV receiver is close to the secondary transmitter, the secondary transmitter can assume that the channel gain is the same as the channel gain from the primary transmitter to the secondary transmitter (possibly with some correction term). The channel between secondary transmitter and receiver is typically measured by the secondary receiver and fed back to the secondary transmitter. Alternatively, path gains for some primary systems (like TV) could be provided in some propagation database or propagation map. This allows a secondary transmitter to query the channel gain from a particular primary transmitter to primary receiver located at a certain position (e.g., the secondary transmitter location). Depending on the location granularity of the propagation maps stored in the database, some interpolation may be used in this step. A further alternative is that the channel gains are derived from a propagation model, which depends, for example, on the location of the transmitter and receiver, and some propagation parameters which depend, for example, on antenna types, antenna heights, terrain factors, and frequency band.

Obtaining Channel State Information in Uplink Mode

Figure 7:
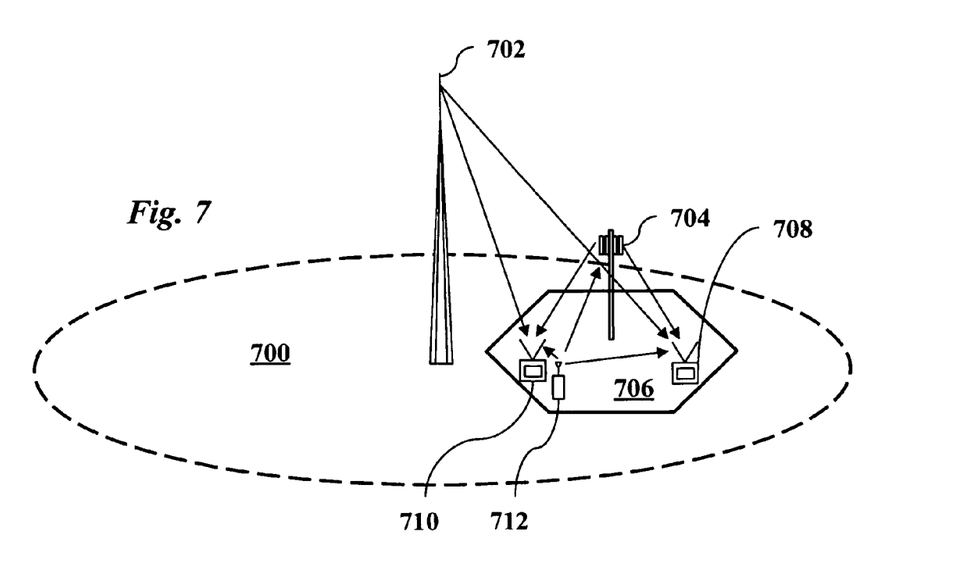
FIG. 7 is a schematic diagram of components of a TV broadcast system and a cellular communication system operating in uplink mode illustrating a critical TV receiver, according to an embodiment of the present invention.

For secondary uplink transmission (FIGS. 2 and 4), channel estimation is performed similarly as for the downlink case. However, for the uplink more channels are involved as the cognitive relay (the BS) differs from the secondary transmitter (the UE). With the same reasoning as for downlink transmission, the critical TV receiver in the uplink is the one which is separated by a minimum distance from the UE. FIG. 7 illustrates the critical primary receiver in the situation of secondary uplink mode. TV transmitter 702 broadcasts in TV service area 700 while cell base station 704 operates in cell 706 within TV service area 700. TV receivers 708 and 710 located within cell 706 are approximately equal distances from base station 704, but receiver 710 is positioned next to cellular user device 712 which is transmitting in uplink mode while TV receiver 708 is relatively far from cellular device 712. TV receiver 710 thus experiences stronger interference from transmissions of cellular device 712 and is thus the critical primary receiver in this situation. To ensure quality of service for the TV receivers, base station 704 thus needs to relay the primary signal with sufficient power to provide the critical receiver 710 with at least a minimum level of primary signal.

The channel $|h_{sp\_UE}|$ is thus again a constant that can be determined by measurement or from a propagation model. In order to determine the relay power at the BS according to Eq. 7, the channel gains $|h_{sp\_BS}|$ and $|h_p|$ are required. Since the critical TV receiver is assumed to be located next to the UE, the BS can determine $|h_{sp\_BS}|$ to be similar to the BS-UE channel gain $|h_s|$. The primary channel gain $|h_p|$ can be estimated by the base station either from a radio propagation map or by measuring the TV channel gain and adding a location-specific compensation term from a propagation model. However, in contrast to the downlink case, in the uplink the critical TV receiver is not located next to the BS and may therefore perceive different shadowing, which can be compensated with a shadowing margin.

For the secondary transmission, $|h_{ps}|$ can be determined at the base station and used for interference cancellation. For this the condition of Eq. 8 should be fulfilled. This is typically the case due to a higher channel gain of a BS compared to a TV receiver due to higher antenna height. The channel gain of the secondary radio link IN may be derived from the secondary cellular signal sent by the UE.

Feasibility

The feasibility of cognitive transmission depends on the power fraction a since only the remainder (1−α) of the secondary transmit power remains useable for secondary transmission. The power fraction that is required for relaying depends on the displacement of the secondary transmitter from the primary transmitter, which may be derived using a distance-dependent propagation model. For a channel i the channel gain may be estimated using $$h_i^2 = c_i^{-1} \cdot d_i^{-\gamma},$$

where $d_i$ is the distance between transmitter and receiver, where $c_i$ is a propagation constant, and where $\gamma_i$ is a propagation exponent. The relay power fraction for a certain location of a secondary transmitter can similarly be determined if the channel gains are obtained by other means. The loss of available transmission power can be seen as a loss of link budget on the transmission channel, which leads to a reduced system capacity. From this loss, a feasibility of the secondary cognitive transmission can be derived. However, other terms also contribute to the feasibility of cognitive transmission. The SINR for secondary transmission (and thereby the capacity available for secondary transmission) can be expressed as $$SINR_s = \frac{|h_s|^2 P_s (1-\alpha)}{N_s}, \quad (9)$$

under the assumption that interference cancellation or dirty paper coding against interference works perfectly. Otherwise the SINR (and capacity) is largely reduced to $$SINR_s = \frac{(1-\alpha)|h_s|^2 P_s}{N_s + |h_{ps}|^2 P_p + |h_s|^2 \alpha \cdot P_s}. \quad (10)$$

Dirty paper coding can be applied if the channel can be estimated from the secondary receiver and the channel gains are fed back to the secondary transmitter. This channel esti mation works under the condition that the pilot signal of the primary transmission can be decoded, that is, when $$INR_s = \frac{K_p|h_{ps}|^2 P_p + K_s|h_s|^2 \alpha P_s}{N_s + (1-\alpha)|h_s|^2 P_s} \geq \gamma_{Ppilot}, \quad (11)$$

where $K_P$, $K_S$, are amplifications of pilot power for power boosting at the primary and the secondary transmitter respectively, and $\gamma_{Ppilot}$ is the required SINR for decoding the pilot signal. This condition depends on the channel gains $h_S$ between the secondary transmitter and the secondary receiver and $h_{PS}$ between primary transmitter and secondary receiver. If these channel gains become too weak, a receiver cannot estimate the channel and dirty paper coding fails. For those secondary receivers that fulfill the above condition (Eq. 11), the feasibility of cognitive transmission reduces according to $(1-\alpha)$ (see Eq. 9), whereas for other receivers the feasibility decreases much further according to Eq. 6. Similarly, if interference cancellation is applied instead of dirty paper coding the SINR of Eq. 9 is achieved if the primary signal can be decoded at the secondary receiver, which is possible if $$INR_s = \frac{|h_{ps}|^2 P_p + |h_s|^2 \alpha P_s}{N_s + (1-\alpha)|h_s|^2 P_s} \geq \gamma_{Psignal} \quad (12)$$

where $\gamma_{Psignal}$ is the SINR required to be able to decode the primary signal. If decoding does not succeed the feasibility drops according to Eq. 10. As a result of Eq. 11 and Eq. 12, feasibility of secondary transmission may drop significantly if the secondary receiver and transmitter have small channel gain ($h_S$), e.g., if they are far separated.

In secondary cognitive uplink transmission, a mobile device or user equipment (UE) transmits as secondary transmitter to a secondary receiver, e.g., a secondary base station (BS). The primary SINR then becomes $$SINR_P = \frac{P_P \cdot |h_P|^2 + \alpha \cdot P_{S\_BS} \cdot |h_{SP\_BS}|^2}{N_P + P_{S\_UE} \cdot |h_{SP\_UE}|^2} \geq \gamma_{TVmin}, \quad (9)$$

and the primary system needs to be protected by requiring to achieve a minimum SINR $\gamma_{TVmin}$. A difference compared to downlink is that the relaying is performed by the secondary receiver (the base station with transmit power $\alpha P_{S\_BS}$ which has a channel gain $h_{SP\_BS}$ to the critical primary receiver), to compensate for interference to the primary critical receiver that is caused by the secondary transmitter (the UE with transmit power $P_{S\_UE}$ and a corresponding channel gain $h_{SP\_UE}$). The transmit power $\alpha \cdot P_{S\_BS}$ for relaying becomes $$\alpha = \frac{\gamma_{TVmin} \cdot (N_P + P_{S\_UE} \cdot |h_{SP\_UE}|^2) - P_P \cdot |h_P|^2}{P_{S\_BS} \cdot |h_{SP\_BS}|^2}, 0 \leq \alpha \leq 1. \quad (10)$$

The channel gain $h_{SP\_UE}$ can be determined according to a worst case analysis implying that the critical receiver is located at a minimum distance to the secondary transmitter (the UE), and thus the channel gain becomes a constant. The channel gain $h_p$ can be estimated by estimating the channel at the secondary receiver (BS) and adding a pathloss compensation and shadowing margin according to the UE location (which is equivalent to the location of the critical primary receiver). Alternatively, the channel gain $h_P$ at the location of the secondary transmitter can be determined from a propagation map stored in a database. In secondary uplink transmission a limiting factor becomes when the secondary receiver (i.e., BS) cannot relay the primary signal at high enough power to compensate for interference caused by the secondary transmitter. This is the case when $h_{sp\_BS}$ becomes very small, i.e., when the secondary transmitter is far away from the base station. This is the case when a would grow larger than one. As a result, the coverage range (UE to BS distance) of secondary cognitive uplink transmission is limited.

Figure 8:
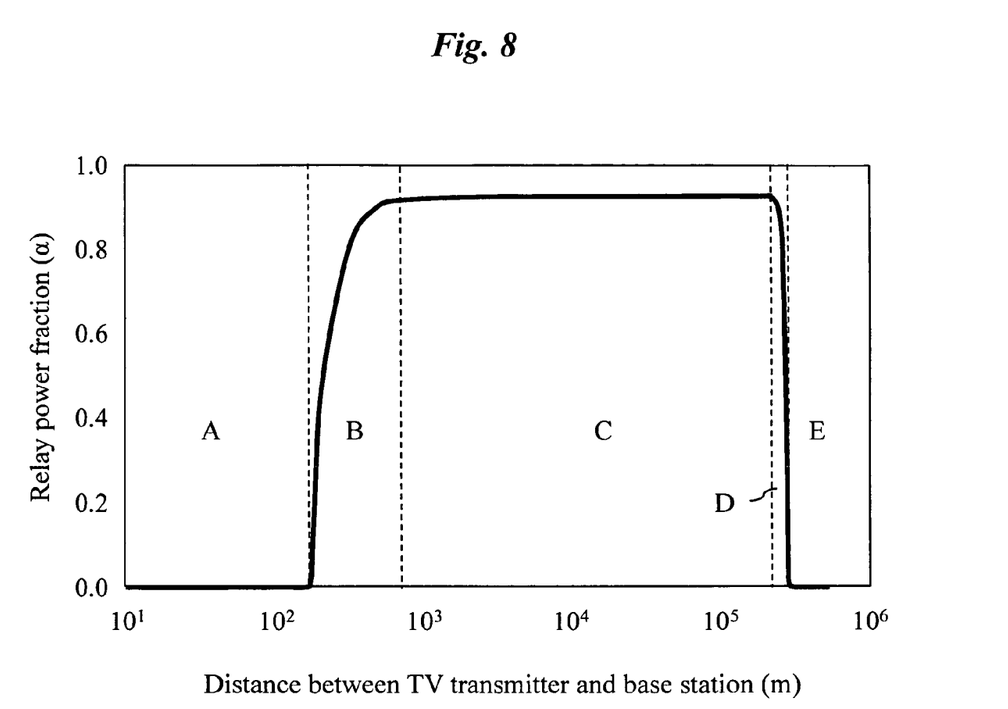
FIG. 8 is a graph of relay power fraction versus distance between a TV transmitter and base station, according to an embodiment of the present invention.

The feasibility varies in different areas of the TV system service area and depends on the locations of the transmitters and receivers. The propagation model allows simplifying the overlay system as a one-dimensional system, where channel gains only depend on the absolute distances between the TV transmitter, the critical TV receiver, the cognitive base station and the user equipment. In the downlink, the fraction of power that is required for relaying the TV signal from the base station depends on different displacements of the base station from the TV transmitter. Five different regions can be distinguished, as shown in FIG. 8 which is a graph of the relay power fraction versus distance between TV transmitter and base station. The exact extent of these regions can be determined from the particular primary and secondary transmission parameters. Specifically, the extent of the regions depend on configuration parameters of the TV system and the cellular system (e.g., antenna heights, transmit power, and so on). For illustrative purposes, approximate values for typical system parameters are provided in the following discussion. In region A (which typically extends to at most a couple hundred meters) the relay power remains zero. In this region the signal power of the TV signal is so strong that even when a cellular base station is transmitting at full power, the received TV SINR remains above $\gamma_{TVmin}$. Secondary transmission in region A is similar to the underlay approach of spectrum sharing: the secondary transmission remains unnoticed by the dominant primary system. (A difference is that it remains within a SINR bound of the primary system rather than below an absolute interference level.) In region B the relay power starts to increase before it converges to a maximum value in region C; it typically covers the range of approximately two hundred to seven hundred meters displacement of the base station from the TV transmitter. The largest part of area is covered in region C, which comprises the displacement from about seven hundred meters up to the TV service area edge at approximately two hundred km. The relay power in region C is approximately constant at 93%. The maximum value of a can be determined as follows: with increasing distance of the base station from the TV transmitter the TV signal degrades. At sufficient separation the term $P_p \cdot |h_p|^2$ (and also $N_p$) becomes negligible compared to $P_{s\_BS}|^2$, so the average SINR at the critical TV receiver reduces to $$\overline{SINR}_p = \frac{\alpha}{1-\alpha},$$

which leads to a relay power of $$\alpha_{max} = \frac{\gamma_{TVmin}}{1 + \gamma_{TVmin}}.$$

This implies that in region C the TV signal transmitted from the TV transmitter becomes negligible at the critical TV receiver; only the base station remains significant, which transmits both the TV signal and the interference of the cellular signal. The relay power remains at $\alpha_{max}$ even outside the TV service area if no SNR loss for the TV signal is acceptable. In this case, even a weak (i.e., very distant) interfering signal $|h_s|^2 \cdot P_s$ is compensated with an equally weak relayed signal to maintain the SINR. If a small SNR loss (we assume 0.1 dB) at the TV service area edge is permissible, this results in a protection zone around the TV service area. This corresponds to region D with a displacement of 227-292 km. In this area the relay power decreases with distance. By relaying with appropriate power the TV SINR is controlled to remain within the acceptable SNR loss at the TV service area edge. In region E the secondary transmission is far away from the TV service area and secondary transmission does not interfere with the TV service. Transmission in region E with a protection zone (i.e., region D) corresponds to the interweave approach of spectrum sharing.

In uplink operation, the power used for relaying the TV signal is only limited by the maximum transmit power of the BS. If we assume that no TV system is present, a UE with 200 mW transmit power could be separated from the BS by approximately 2 km and still obtain a data rate of 1 Mb/s according to Shannon capacity. When a TV system is present, the maximum distance between the UE and the BS depends on how far away the BS is capable of compensating for interference caused by UE transmission to a critical TV receiver. In a typical scenario, if a UE is located less than a few hundred meters from the TV transmitter, the BS does not need to relay the TV signal. If the UE is further away, the BS is quickly limited by its maximum transmit power in preventing TV service degradation. Specifically, in this case, the maximum distance between UE and BS that still allows protecting the TV service is typically less than 100 m. This maximum UE-BS distance corresponds to the distance where the maximum relay power $\alpha=1$ is reached when $P_p \cdot |h_p|^2$ and $N_p$ are negligible.

The feasibility of cognitive transmission can also be affected by other aspects. These can be used to select which transmitter and/or receiver can be enabled for cognitive transmission. These aspects include receiver characteristics. More specifically, different receivers have different performance characteristics for interference cancellation or dirty paper decoding, e.g., due to the algorithm or precision of the analog-to-digital converters. If the receiver characteristics are known for different receivers, a feasibility factor can be determined separately for each one. The feasibility is also affected by the velocity of a transmitter or receiver (typically the UE). With larger velocity, the channel estimation becomes less precise. Also, interference cancellation and dirty paper coding becomes erroneous when the channel gain varies during the transmission. For this reason it is more feasible to select secondary transmitters and/or secondary receivers with lower mobility and/or velocity for cognitive transmission.

Figure 9:
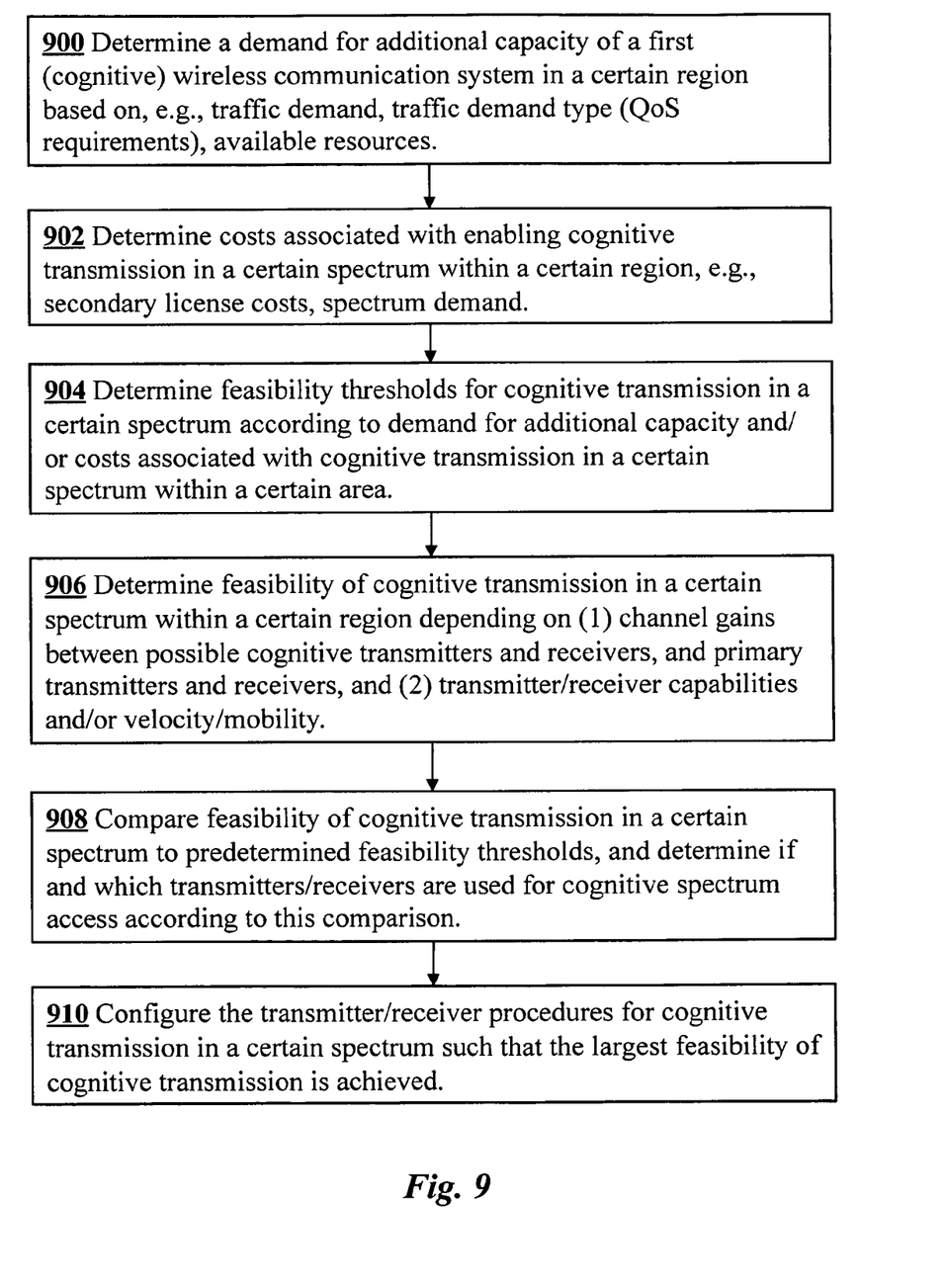
FIG. 9 is a flow chart illustrating steps of a method for performing cognitive transmission, including determining feasibility of cognitive transmission, according to an embodiment of the invention.

A procedure for the management of cognitive transmission according to one embodiment of the invention is outlined in FIG. 9. In step 900, a demand is determined for additional capacity of a first (cognitive) wireless communication system in a certain region. The demand may be determined based on a number of factors including, for example, traffic demand, traffic demand type (QoS requirements), and available resources. In step 902, costs associated with enabling cognitive transmission in a certain spectrum within a certain region are determined. The costs may include, for example, secondary license costs and spectrum demand. In step 904, feasibility thresholds for cognitive transmission in a certain spectrum are determined according to demand for additional capacity and/or costs associated with cognitive transmission in a certain spectrum within a certain area. In step 906, feasibility of cognitive transmission in a certain spectrum within a certain region is determined. The feasibility may depend on (1) channel gains between possible cognitive transmitters and receivers, and primary transmitters and receivers, and/or (2) transmitter/receiver capabilities and/or velocity/mobility. In step 908, the feasibility of cognitive transmission in a certain spectrum is compared to the predetermined feasibility thresholds. The step also determines according to this comparison if and which transmitters/receivers should be enabled to use cognitive spectrum access. In step 910, the transmitter/receiver procedures for cognitive transmission in a certain spectrum are configured such that the largest feasibility of cognitive transmission is achieved. The selected transmitters/receivers then perform cognitive transmission in accordance with the configured procedures.

Discussion

Cognitive transmission provides a means to largely increase the capacity of, a secondary communication system by enabling it to use radio resources allocated to another primary system. Given the scarcity of radio spectrum, spectrum sharing is considered as a feasible future for spectrum regulation. This is in particular beneficial for a cellular wireless broadband network that can transmit cognitively in TV spectrum as secondary user. It can be well motivated that both a wireless broadband network as well as a TV network can profit from such cooperative transmission. The wireless network can increase its capacity; the TV network can enjoy better service coverage in certain areas (where cognitive relaying can overcome a coverage hole of the TV system) and may have a financial benefit for leasing its spectrum to a secondary system. However, cognitive transmission is not in all situations beneficial. In some cases it may provide only marginal performance for the secondary wireless system, and in other cases it may lead to harmful interference to the primary TV system (when the secondary system cannot compensate the interference it generates by relaying of the primary signal). This teachings of the present invention overcome those problems by determining the feasibility of cognitive transmission, and then identifying opportunities for when cognitive transmission is beneficial. In particular, they determine for which secondary transmitters and or receivers cognitive transmission is feasible without harming the primary system.

The system architecture presented in the preferred embodiments is based on a business model of a strategic partnership between the TV broadcast operator (with primary spectrum usage rights) and the cellular network operator. In this scenario, the cellular network is the only secondary user that shares spectrum resources with the primary user. Secondary spectrum usage always has the drawback for a secondary operator that there is uncertainty about the availability of resources. This is a hurdle for any investment in network infrastructure dedicated to secondary usage, since a return on investment remains uncertain. In the system architecture presented, however, only limited investment is required for the cellular operator. The operator already has a network infrastructure in place for cellular operation on a frequency band that is dedicated to mobile communication. Therefore, the secondary cognitive transmission assumes that a) the cellular base station (BS) and cellular user equipments (UE) support secondary cognitive transmission, b) the core network and transport network have sufficient capacity for DTV data stream distribution, c) a management system for secondary TV band transmission is introduced, and d) that an agreement between the primary and secondary operators is obtained.

The secondary licensing process could be automated, e.g., by some form of regular auction. Different cellular operators could then determine their bidding price according to their traffic demand and need for additional capacity, as well as the market price for secondary spectrum licenses. The cellular operator could profit from this approach of secondary cognitive transmission by having potentially cheap access to additional spectrum capacity (at times when no additional spectrum is available for primary licensing), but also by being able to adapt the capacity that is provisioned in the network more dynamically to traffic demand (instead of buying a primary license over multiple decades based on vague long-term market predictions). For a TV broadcast operator, cognitive transmission can also bear some advantages. In particular, secondary licensing for cognitive transmission can bring a financial gain. In addition, it can help in network planning and operation. A TV network has very large service areas; environmental structures can lead to certain regions with insufficient service performance. A TV network can compensate for this by adding gap fillers (e.g., co-channel repeaters), thereby creating local SFN regions. However, this requires deployment of costly infrastructure. At the same time, cellular network operators already provide a dense infrastructure and the corresponding backbone network. Closing TV coverage gaps by cooperation with a cellular network can prove to be a more cost-efficient solution, as well as finer in granularity, compared to a stand-alone TV gap filling solution. Such a TV coverage obligation can be included in a secondary license agreement. To sum up: secondary cognitive transmission can provide benefits for both the TV and the cellular network operators.

The presented solution allows a cellular network to coexist with the TV network without any modification to TV receivers. Different regimes of operation are observed depending on the relative positions of the two systems: 1) Low interference regime: in this regime no cooperation is needed. The required quality-of-service (SINR) at all TV receivers is met even in the presence of the interference. 2) Moderate interference regime: in this regime cooperation is done in order for TV receivers to meet the quality-of-service requirement. 3) High interference regime: in this regime most of the base station power is used for cooperation.

Although the overlay architecture in general requires the cellular network to use part of its power to compensate for caused interference, it can still be a desirable mode of operation for cellular operators. The overlay approach allows an access to frequency bands that otherwise cannot be used. Furthermore, the current frequency allocation for TV systems has more favorable propagation characteristics than the cellular bands. This can lead, not only to increased rate performance, but also to better coverage in a cell.

Although the preferred embodiments have been described using specific details for the purposes of illustration, those skilled in the art will appreciate that the principles of the invention are not limited to these specifics. In addition, it will be appreciated that more general channel models and more sophisticated propagation models may be beneficially used in variations of the embodiments.

The invention claimed is:

1. A method for wireless spectrum sharing, the method comprising:
broadcasting a primary signal from a primary transmitter using a primary wireless spectrum assigned to a primary communication system;
transmitting a secondary signal from a secondary transmitter to a secondary receiver using the primary wireless spectrum assigned to the primary communication system, wherein the secondary transmitter and the secondary receiver belong to a secondary communication system to which no wireless spectrum is assigned, or to which a secondary wireless spectrum is assigned, wherein the secondary wireless spectrum is distinct from the primary wireless spectrum;
wherein transmitting the secondary signal from the secondary transmitter comprises transmitting with a total power P split between power $\alpha P$ used by the secondary transmitter to transmit the primary signal, whereby the primary signal broadcasted by the primary transmitter is amplified, and power $(1-\alpha)P$ used by the secondary transmitter to transmit the secondary signal to the secondary receiver;
wherein $\alpha$ is computed by the secondary transmitter to protect the primary signal from quality of service degradation caused by the secondary signal by selecting $\alpha$ such that the power $(1-\alpha)P$ of the secondary signal ensures that an SINR of the primary signal received by a hypothetical primary receiver located near the secondary transmitter exceeds a predetermined SINR threshold.

2. The method of claim 1 wherein the secondary transmitter is a cellular base station and wherein the secondary receiver is a cellular user device.

3. The method of claim 1 wherein the secondary receiver is a cellular base station and wherein the secondary transmitter is a cellular user device.

4. The method of claim 1 wherein the primary communication system is a television broadcast system.

5. The method of claim 1 further comprising communicating from the primary communication system to the secondary transmitter codewords and transmission timing information of the primary signal.

6. The method of claim 1 wherein the primary signal and secondary signal are transmitted from the secondary transmitter using superposition coding.

7. The method of claim 1 wherein the primary signal and secondary signal are transmitted from the secondary transmitter using dirty paper coding.

8. The method of claim 1 further comprising receiving at the secondary receiver the primary and secondary signals and using interference cancellation to attenuate the primary signal.

9. The method of claim 1 further comprising estimating by the secondary receiver channel state information of the channel from the primary transmitter to the secondary receiver.

10. The method of claim 9 further comprising transmitting from the secondary receiver to the secondary transmitter the estimated channel state information.

11. The method of claim 9 further comprising using the estimated channel state information at the secondary receiver to perform interference cancellation.

12. The method of claim 9 further comprising using the estimated channel state information at the secondary transmitter to perform dirty paper coding.

13. The method of claim 1 further comprising estimating by the secondary transmitter channel state information of the channel from the primary transmitter to the hypothetical primary receiver located near the secondary transmitter.

14. The method of claim 1 wherein the hypothetical primary receiver is a hypothetical primary receiver with a worst case channel gain from the secondary transmitter.

15. The method of claim 1 further comprising:
computing by the secondary transmitter a feasibility of using cognitive transmission;

selecting to enable using the primary wireless spectrum to transmit from the secondary transmitter when the computed feasibility exceeds a feasibility threshold; and selecting to disable using the primary wireless spectrum to transmit from the secondary transmitter when the computed feasibility does not exceed a feasibility threshold.

16. The method of claim 14 wherein the feasibility is computed from channel state information, velocity of the secondary transmitter, velocity of the secondary receiver, or capabilities of the secondary receiver.

17. The method of claim 14 wherein the feasibility threshold is determined from a cost for the secondary communication system to use the primary wireless spectrum.

18. A method for wireless spectrum sharing, the method comprising:

transmitting a secondary signal from a secondary transmitter to a secondary receiver using a primary wireless spectrum assigned to a primary communication system, wherein the secondary transmitter and the secondary receiver belong to a secondary communication system to which no wireless spectrum is assigned, or to which a secondary wireless spectrum is assigned, wherein the secondary wireless spectrum is distinct from the primary wireless spectrum;

wherein transmitting the secondary signal from the secondary transmitter comprises transmitting with a total power P split between power $\alpha P$ used by the secondary transmitter to transmit a primary signal, whereby the primary signal broadcasted by the primary transmitter is amplified, and power $(1-\alpha)P$ used by the secondary transmitter to transmit the secondary signal to the secondary receiver;

wherein $\alpha$ is computed by the secondary transmitter to protect the primary signal from quality of service degradation caused by the secondary signal by selecting $\alpha$ such that the power $(1-\alpha)P$ of the secondary signal ensures that an SINR of the primary signal received by a hypothetical primary receiver located near the secondary transmitter exceeds a predetermined SINR threshold.

19. A secondary transmitter implementing a method for wireless spectrum sharing, the method comprising:

transmitting a secondary signal from the secondary transmitter to a secondary receiver using a primary wireless spectrum assigned to a primary communication system, wherein the secondary transmitter and the secondary receiver belong to a secondary communication system to which no wireless spectrum is assigned, or to which a secondary wireless spectrum is assigned, wherein the secondary wireless spectrum is distinct from the primary wireless spectrum;

wherein transmitting the secondary signal from the secondary transmitter comprises transmitting with a total power P split between power $\alpha P$ used by the secondary transmitter to transmit the primary signal, whereby the primary signal broadcasted by the primary transmitter is amplified, and power $(1-\alpha)P$ used by the secondary transmitter to transmit the secondary signal to the secondary receiver;

wherein $\alpha$ is computed by the secondary transmitter to protect the primary signal from quality of service degradation caused by the secondary signal by selecting $\alpha$ such that the power $(1-\alpha)P$ of the secondary signal ensures that an SINR of the primary signal received by a hypothetical primary receiver located near the secondary transmitter exceeds a predetermined SINR threshold.

\* \* \* \* \*